E. A. RIX.
LUBRICATING SYSTEM FOR FLUID COMPRESSORS.
APPLICATION FILED MAR. 5, 1919.
1,396,666.
Patented Nov. 8, 1921.
2 SHEETS—SHEET 2.
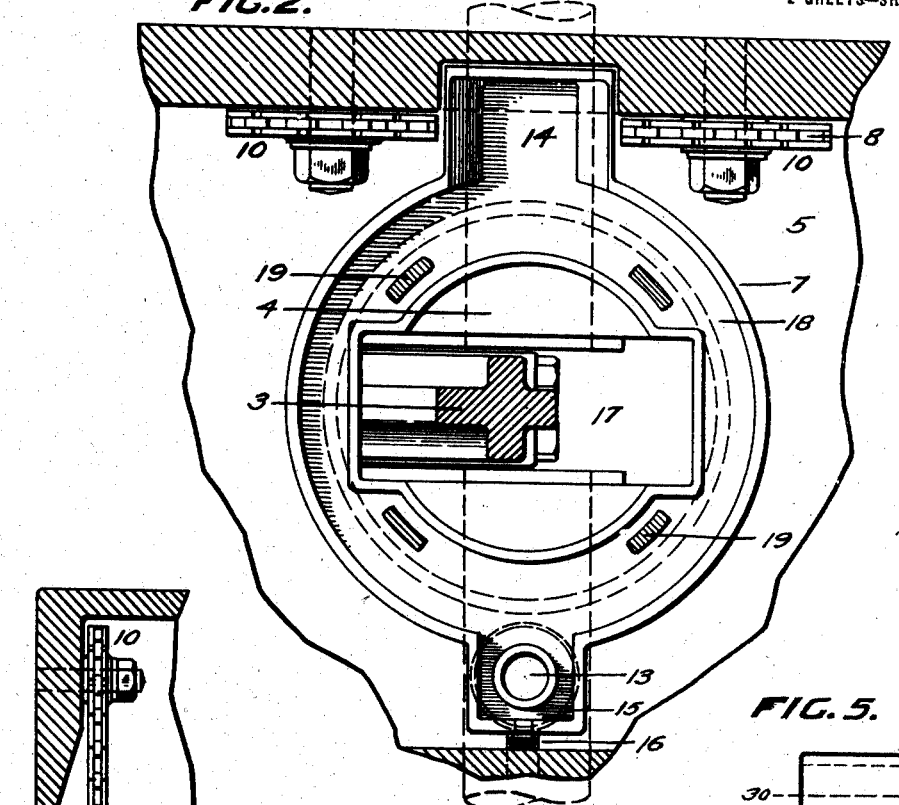
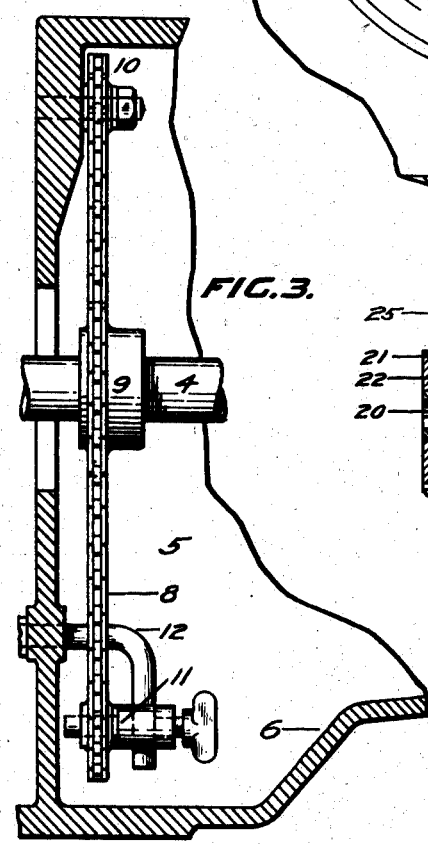
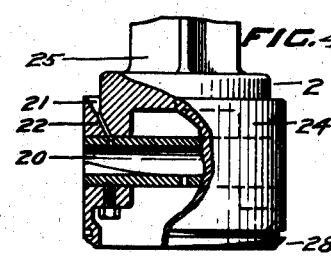
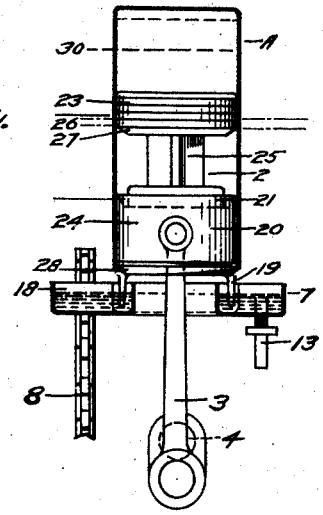
INVENTOR
EDWARD A. RIX.
BY
Strong and Townsend
ATTORNEY

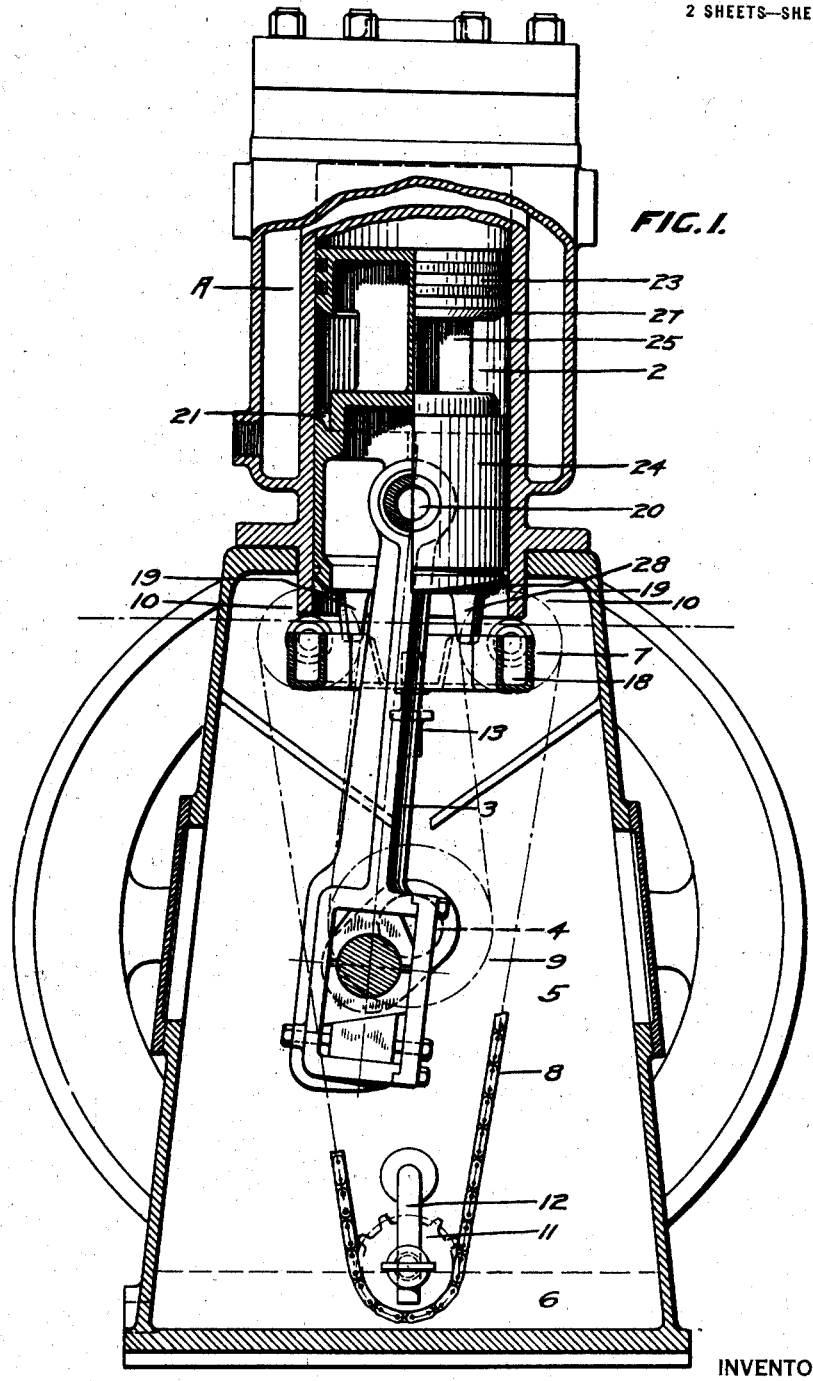

UNITED STATES PATENT OFFICE.

EDWARD A. RIX, OF OAKLAND, CALIFORNIA.

LUBRICATING SYSTEM FOR FLUID-COMPRESSORS.

1,396,666.   Specification of Letters Patent.   Patented Nov. 8, 1921.

Application filed March 5, 1919. Serial No. 280,684.

*To all whom it may concern:*

Be it known that I, EDWARD A. RIX, a citizen of the United States, residing at Oakland, in the county of Alameda and State of California, have invented new and useful Improvement in Lubricating Systems for Fluid-Compressors, of which the following is a specification.

This invention relates to a lubricating system for air and other fluid compressors of the reciprocating piston type employing vertically disposed cylinders whose lower ends are open and in communication with a crank case of the closed type.

This type of compressors has heretofore been lubricated by the splash oiling system which consists in filling the bottom of the crank case or a pan located above the bottom but below the shaft with oil and allowing the crank or connecting rod or splash pins actuated by the crank rod or shaft to dip into this oil as the shaft revolves and throw the oil in all directions, reaching the piston pin above, the walls of the cylinders, and all the bearings. There can be no method of distributing the oil more effective as far as lubricating is concerned, but it is found in practice that so much oil falls on the cylinder walls that an excess is carried by the reciprocal movement of the piston up the cylinder walls and into the cylinders, whence it is carried by the fluid being compressed out into the discharge pipes, causing not only a waste of lubricant but troublesome carbon deposits from overheating the oil on the valves and adjacent parts, and also causing damage to the work being processed by the compressed fluid on account of the excess oil it carries in the shape of vapor or fog. The main object of the present invention is to provide means for regulating the quantity of oil delivered to the cylinder walls while otherwise preserving all of the virtues of a generous supply of lubricant to all other parts.

In general, my invention consists in arranging upon suitable supports a shallow pan above the crank shaft which is slotted to permit a free movement of the connecting rods, said pan more than covering the cylinder opening immediately about it. The invention further provides means for delivering oil to said pan and for maintaining a constant level therein.

Another purpose of the invention is to provide an adjustable overflow in the pan so that the oil level maintained may be increased or decreased. Another feature of the invention is the provision of a piston which is so constructed that its lower edge will dip into the oil in the pan, or small projections called fingers may be provided on the piston to pierce the surface of the oil and on its return or upward stroke the oil adhering to the piston or to the fingers is distributed over the surface of the cylinder and a thorough lubrication effected, the amount of oil delivered to the cylinder walls depending upon the oil level maintained. Another feature of the invention is the provision of a piston which consists of two sections, the lower section serving the function of delivering oil to the cylinder walls and the wrist pin supporting the connecting rods and also for delivering oil to an elevated point along the cylinder walls which is reached by the upper section of the piston and then further elevated by said piston as will hereinafter be described. Further features of the invention will hereinafter be described.

The invention consists of the parts and the construction, combination and arrangement of parts as hereinafter more fully described and claimed, having reference to the accompanying drawings, in which—

Figure 1 is a central vertical section through a compressor showing the application of the invention, said figure being partly broken away and partly in section to clearly illustrate the invention.

Fig. 2 is an enlarged plan view of the oil receiving pan, a portion of the crank case supporting the same being shown in section.

Fig. 3 is a detail section of one side of the crank case showing the position of the oil elevating mechanism.

Fig. 4 is a detail sectional view, partly broken away, showing the lower portion of the piston and the wrist pin secured therein.

Fig. 5 is a diagrammatic view showing the method of delivering the lubricating oil and distributing the same over the cylinder wall surfaces.

Referring to the drawings in detail, A indicates the cylinder of an air compressor, 2 the piston, 3 the connecting rod, 4 the crank shaft and 5 the crank case inclosing the same. Formed in the lower portion of the crank case is a well or oil collecting chamber 6, and suitably supported below the lower open end of the cylinder A is an oil pan, generally indicated at 7, to which oil is delivered by means of a sprocket chain 8. This sprocket chain is endless and is driven by a sprocket gear 9 secured on the crank shaft. The chain driven by this sprocket gear passes over a pair of idlers 10 disposed one on each side of the pan and then passes over a third idler 11 positioned in the well portion of the crank case, as shown, said idler being supported on an adjustable bracket 12 to permit slack to be taken up from time to time, if required. The chain traveling continuously during the operation of the compressor and passing through the oil contained in the well 6 will carry this upwardly to the pan. It is here thrown off the chain by centrifugal force and also by scraping action, as the chain when passing over the idlers 10 runs in close proximity to the edge of the same. A liberal quantity of oil is thus delivered to the pan and will here assume a certain level which is determined by an adjustable overflow pipe shown at 13. This pipe is screwed into the bottom of the pan and it is therefore possible to maintain a fixed oil level within the pan and to vary said oil level by merely turning the overflow pipe 13 to raise or lower the same.

By referring to Fig. 2 it can be seen that the pan is approximately circular in shape and that it is supported by two lateral extensions, as shown at 14 and 15. The extension 14 passing between the idlers 10 is supported by a flange in the side of the crank case, while the opposite extension 15 carrying the overflow pipe 13 is supported and secured by a screw 16 carried upon the opposite side of the crank case. The pan is otherwise slotted centrally, as at 17, to permit the connecting rod to pass therethrough and to permit a free movement of the same, the inner wall around said slotted opening being raised to form a circular trough 18 into which the lower end of the piston or fingers carried thereby may dip during the reciprocal movement of the piston.

By referring to Figs. 1 and 2, it will be seen that the direction of rotation of the crank shaft is immaterial as far as the elevating chain is concerned, as the chain passing over the idlers 10 will always deliver oil to one of the lips of the extension 14 regardless of the direction of rotation.

By referring to Fig. 1 it will be seen that the piston is made of such length that at the bottom of the stroke the lower edge dips into the oil in the pan or small projections 19 called fingers pierce the surface of the oil, and, on its return or upward stroke, the oil adhering to the piston or the fingers is distributed over the surface of the cylinder and a thorough lubrication effected. It is very evident that the more the piston dips into the oil the greater will be the amount of oil carried up into the cylinder, and, as the level of the oil in the pan may be regulated by raising and lowering the overflow from the pan, it is evident that means for regulating the amount of oil carried by the piston into the cylinder is provided. If the oil level is held at a point where the piston cannot reach it, then no oil can be lifted, as the entire lower end of the cylinder is practically closed by the pan. Again, as the oil level is raised, any desired quantity may be obtained. Actual results show that a dip of one-eighth of an inch is ample and an inch would be excessive. It is therefore obvious that the pan need never be more than one and one-half inches deep for any machine.

After the oil is distributed over the cylinder as described it has two duties to perform: First, to lubricate the piston or wrist pin shown at 20; secondly, the remainder of the cylinder wall. The pin is lubricated by turning an annular groove 21 in the piston just above the pin and making the groove of such a shape that the outer edge next the cylinder wall will have an acute angle so that it may scrape the oil from the cylinder walls and deliver it to the bottom of the groove, from whence it is drained downwardly through holes 22 (see Fig. 4) into the hollow wrist pin.

In actual practice I give the piston a dip into the oil pan which is sufficient to furnish oil enough to lubricate the piston pin, and after that there is still an excess of oil on the wall of the cylinder that is forced upwardly by the travel of the piston until, if not prevented, would accumulate on the top of the piston and be carried out by the fluid being compressed and cause an excess of oil troubles that have previously been mentioned. This trouble is obviated in the present instance by providing what may be termed a divided piston, that is, a piston having a top section 23 and a bottom section 24, both connected by a waist 25 of lesser diameter and making the waist the length of the stroke or a little less, as will hereinafter be described. The upper end of the lower piston section 24 carries the scraper groove that delivers oil to the wrist pin and it is evident that this sharp scraper edge, when reaching the top of the stroke, will leave on the cylinder wall a very thin annular ridge of oil, for instance, at the point indicated by the dotted line 26 (see Fig. 5), and, if the upper piston head on its down stroke does not touch this ridge of oil, then no lubricant whatever can ever reach the upper part of the cylinder wherein the upper piston portion travels. This, of course, is undesirable and I therefore make the upper piston head long enough to dip into this thin ridge of oil left upon the lower scraper edge. The amount of dipping into this annular ridge of oil will determine the amount of oil the upper piston receives, and in turn, determines the amount delivered into the compressing space above the piston. In practice, a dipping of about three-sixteenths of an inch into the annular ridge of oil left upon the lower piston portion is sufficient, thus making the length of the waist section of the piston three-sixteenths of an inch less than the stroke. I find the results are perfect and any desired quantity of lubricant can be introduced into the compressing cylinder from almost zero to excess. I also find that it is quite important to construct a piston so that the trend of all oil drip or drain is toward the center from the cylinder walls where at all times there is a tendency for a thin film of oil to be continually traveling upward. To obviate this continuous upward travel I bevel the bottom of both piston heads inwardly, as shown at 27 and 28. These bevel edges thus form two scraping ridges in addition to the sharp scraper which collects the oil for the wrist pin, thereby insuring a complete removal of all excess oil that may be delivered to the cylinder wall.

The diagrammatic view shown in Fig. 5 illustrates the distribution of the lubricating oil; first, the delivery to the pan; secondly, the means for regulating the level therein; third, the fingers carried by the piston whereby the oil is elevated and delivered to the cylinder wall; fourth, the means for distributing the oil and forcing it upwardly to the line indicated at 26 which is accomplished by the lower piston section; fifth, the movement of the upper piston section below the line 26 to the point indicated at 30 to further elevate the oil, or, in other words, to provide the upper section of the cylinder with a quantity just sufficient to lubricate the upper portion; and, sixth, the thin edges shown at 27 and 28 for further insuring the removal of any excess oil that may be delivered.

From the foregoing it can be seen that means have been provided for positively regulating the quantity of oil delivered to the cylinder wall and for equally distributing the same, this being accomplished without effecting a generous supply to the crank case, the wrist pin, the crank pin or the bearing supporting the crank shaft. For instance, the oil elevated by the chain 8 serves as a means for also elevating oil to the bearings supporting the crank shaft on that side of the case, while the overflow pipe 13 positioned on the opposite side provides a means for delivering oil to the crank shaft bearing on the opposite side. The lubricating oil delivered to the cylinder wall also insures a sufficient supply to the wrist pin and this in turn may drain through the rod directly to the crank pin. All parts are thus liberally lubricated without in any way affecting the delivery to the cylinder walls.

While a chain has here been shown for the purpose of elevating oil to the pan I wish it understood that a splash system, a pump or any other suitable mechanism may be provided; similarly, that the materials and finish of the several parts employed may be such as the experience and judgment of the manufacturers may dictate.

Having thus described my invention, what I claim and desire to secure by Letters Patent is:

1. In a fluid compresser a cylinder, a piston, a crank shaft, a crank case inclosing the same, an oil well in said case, a pan mounted below the cylinder, a plurality of fingers on the piston adapted to dip into the pan to transfer a portion of the oil to the cylinder wall, means for delivering oil from the well to the pan, an overflow member on the pan adapted to maintain a predetermined oil level therein, and directing flanges formed on the crank case adapted to direct the overflowing oil to bearings formed in the case for the support of the crank shaft.

2. In a fluid compressor of the character described the combination with a cylinder and the oil pan mounted below the same, of means for delivering oil to the pan, means for maintaining a predetermined oil level in the pan, a piston reciprocally mounted in the cylinder, a plurality of fingers formed on the lower piston adapted to dip into the oil pan and to transfer oil from the pan to the cylinder wall, means on the piston for removing the major portion of the oil delivered to the cylinder wall, a wrist pin in the piston, and means for conveying the removed oil to the wrist pin.

3. In a fluid compressor, a cylinder, a piston, a crank shaft, a crank case inclosing the same, an oil well in said case, an oil pan mounted below the cylinder into which the piston is adapted to dip, an overflow member adjustably mounted in said pan to regulate the level in the pan and to maintain the level when regulated, and a chain elevator driven by the crank shaft adapted to deliver oil to the pan.

4. In a fluid compressor, a cylinder, a piston, a crank shaft, a crank case inclosing the same, an oil well in said case, a pan mounted below the cylinder into which the piston is adapted to dip, means on the piston of or removing the major portion of the oil delivered to the cylinder wall by the dip of the piston into the pan, means for conveying said oil to the wrist pin of the piston and means for delivering oil from the well to the pan.

5. In a fluid compressor, a cylinder, a piston reciprocally mounted in said cylinder, said piston consisting of an upper section and a lower section connected by a waist section of reduced diameter, said waist section having a length slightly less than the stroke of the piston, a closed crank case supporting the cylinder, a crank shaft journaled in said case, a connecting rod connecting the piston with the crank shaft, an oil well in said crank case, means for delivering oil from said well to the cylinder wall, means on the lower section of the piston for removing the major portion of the oil delivered to the cylinder wall, said means also adapted to deliver a small amount of oil to the upper piston section to permit lubrication of the upper end of the cylinder.

6. In a fluid compressor, a cylinder, a piston reciprocally mounted in said cylinder, said piston consisting of an upper section and a lower section connected by a waist section of reduced diameter, said waist section having a length slightly less than the stroke of the piston, a closed crank case supporting the cylinder, a crank shaft journaled in said case, a connecting rod connecting the piston with the crank shaft, an oil well in said crank case, a pan mounted below the cylinder into which the piston is adapted to dip, means for delivering oil from the well to said pan to permit the piston when dipping into the pan to deliver oil to the lower portion of the cylinder wall, means on the upper end of the lower piston section adapted to remove the major portion of the oil delivered by the dipping of the piston, and means for conveying said oil to the wrist pin of the piston.

7. In a fluid compressor, a cylinder, a piston reciprocally mounted in said cylinder, said piston consisting of an upper section and a lower section connected by a waist section of reduced diameter, said waist section having a length slightly less than the stroke of the piston, a closed crank case supporting the cylinder, a crank shaft journaled in said case, a connecting rod connecting the piston with the crank shaft, an oil well in said crank case, a pan mounted below the cylinder into which the piston is adapted to dip, means for delivering oil from the well to said pan to permit the piston when dipping into the pan to deliver oil to the lower portion of the cylinder wall, means on the upper end of the lower piston section adapted to remove the major portion of the oil delivered by the dipping of the piston, said means also adapted to deliver a small amount of oil to an elevated point in the cylinder where it will be reached by the upper section of the piston, and means for conveying the oil removed to the wrist pin of the piston.

8. In a fluid compressor, a cylinder, a piston reciprocally mounted in said cylinder, said piston comprising an upper section and a lower section connected by a waist section of reduced diameter, a closed crank case supporting the cylinder, an oil well in said case, a crank shaft journaled in the case, a connecting rod connecting the piston and the crank shaft to transmit reciprocal movement to the piston, an oil pan positioned below the cylinder, means for delivering oil to the pan, means carried by the piston adapted to deliver oil from the pan to the cylinder wall, and means carried by the piston for preventing any oil from passing upwardly above the piston.

9. In a fluid compressor of the character described a cylinder, a piston reciprocally mounted therein, said piston consisting of an upper section and a lower section, said sections connected by a reduced waist section, and said waist section having a length slightly less than the stroke of the piston, a wrist pin in the piston, an annular channel formed adjacent the upper end on the lower piston section, said channel terminating in a knife-like annular edge, a drain passage between said annular groove and the wrist pin, and a plurality of projecting fingers formed on the lower end of the piston section.

10. In a fluid compressor of the character described the combination with the cylinder and the case supporting the same, of a piston reciprocally mounted in the cylinder, an oil receiving pan mounted below the cylinder, means on the piston for transferring oil from the pan to the cylinder wall, means for delivering oil to the pan, an overflow member on the pan, and directing flanges formed in the crank case adapted to catch the overflowing oil and direct it to crank shaft bearings formed in the crank case.

11. In a fluid compressor of the character described the combination with the crank case and the cylinder supported thereby, of an oil pan supported directly below the cylinder, said oil pan being circular in formation and having a central opening formed therein, flanges formed on the inner and outer edge of the pan forming a substantial and annular oil receiving groove, a pair of extensions, one on each side of the pan, an overflow member in one of said extensions, said overflow member being adjustable to maintain a predetermined oil level in the pan, and means for delivering oil from the crank case and depositing the same in the opposite extension of the pan.

12. In a fluid compressor, a cylinder, a piston, said piston comprising an upper and a lower section connected by a reduced waist section, said waist section having a length slightly less than the stroke of the piston, a closed crank case supporting the cylinder, a crank shaft in said cylinder for transmitting the reciprocal movement to the piston, an oil well in the crank case, means for delivering oil from the well to the cylinder wall, means carried by the lower piston section for removing the major portion of said oil, said means also adapted to raise a portion of the oil to an elevated point in the cylinder wall that is reached by the upper piston section when this reaches its extreme lowermost position, and means for delivering the oil removed by said member and conveying it to the wrist pin of the piston.

13. In a fluid compressor, a cylinder, a piston member reciprocally mounted in said cylinder, a closed crank case supporting the cylinder, a crank shaft journaled in said case and adapted to impart a reciprocal movement to the piston, an oil pan mounted below the cylinder, a pair of lateral projections on said pan, means along each side of the crank case engaging said lateral projections to support the pan, an overflow pipe screwed into one of said lateral projections and vertically adjustable therein to maintain a predetermined oil level in the pan, a pair of sprocket wheels journaled in the crank case adjacent the opposite lateral projection, a sprocket wheel secured on, and turnable in unison with, the crank shaft, an idler sprocket gear journaled near the bottom of the crank case, and a sprocket chain passing over all of said idlers and driven by the sprocket gear on the crank shaft, said sprocket chain adapted to elevate and deliver oil to the pan.

14. In a fluid compressor of the character described the combination with the crank case and the cylinder supported thereby, of an oil pan supported directly below the cylinder, said oil pan being circular in formation and having a central opening formed therein, flanges formed on the inner and outer edge of the pan forming a substantial and annular oil receiving groove, a pair of extensions, one on each side of the pan, an overflow member in one of said extensions, said overflow member being adjustable to maintain a predetermined oil level in the pan, means for delivering oil from the crank case and depositing the same in the opposite extension of the pan, said means comprising a crank shaft journaled in the crank case, a sprocket gear secured thereon, a pair of sprocket gears journaled in the crank case, one on each side of the pan extensions, a sprocket gear on the bottom of the crank case, and an endless chain reeved over the several sprocket gears to elevate oil to the pan extension.

In testimony whereof I have hereunto set my hand in the presence of two subscribing witnesses.

EDWARD A. RIX.

Witnesses:
JOHN H. HERRING,
W. W. HEALEY.